United States Patent
Wallace et al.

(10) Patent No.: US 7,894,934 B2
(45) Date of Patent: Feb. 22, 2011

(54) REMOTE CONVEYOR BELT MONITORING SYSTEM AND METHOD

(75) Inventors: Jack Bruce Wallace, Powell, OH (US); Mauricio Pinto Spaolonzi, Sao Paulo (BR)

(73) Assignee: Veyance Technologies, Inc., Fairlawn, OH (US)

( * ) Notice: Subject to any disclaimer, the term of this patent is extended or adjusted under 35 U.S.C. 154(b) by 651 days.

(21) Appl. No.: 11/566,901

(22) Filed: Dec. 5, 2006

(65) Prior Publication Data

US 2008/0133051 A1 Jun. 5, 2008

(51) Int. Cl.
*G06F 7/00* (2006.01)

(52) U.S. Cl. .................................. 700/230; 198/341.01

(58) Field of Classification Search .................. 700/230; 198/341.01, 340, 341.03, 341.09, 810.01
See application file for complete search history.

(56) References Cited

U.S. PATENT DOCUMENTS

| | | | |
|---|---|---|---|
| 3,882,305 A | 5/1975 | Johnstone | |
| 4,025,832 A | 5/1977 | Jones, III | |
| 4,109,309 A | 8/1978 | Johnstone | |
| 4,439,731 A | 3/1984 | Harrison | |
| 4,837,704 A * | 6/1989 | Lengefeld | 700/216 |
| 4,864,233 A | 9/1989 | Harrison | |
| 4,955,225 A | 9/1990 | Kniest | |
| 5,124,622 A | 6/1992 | Kawamura | |
| 5,335,777 A | 8/1994 | Murphy et al. | |
| 5,523,854 A | 6/1996 | Hornsby | |
| 5,570,017 A | 10/1996 | Blum | |
| 5,594,663 A | 1/1997 | Messaros | |
| 5,650,940 A | 7/1997 | Tonozuka | |
| 5,847,563 A | 12/1998 | Blum | |
| 6,445,969 B1 * | 9/2002 | Kenney et al. | 700/108 |
| 6,516,239 B1 * | 2/2003 | Madden et al. | 700/115 |
| 6,618,692 B2 | 9/2003 | Takahashi | |
| 6,745,103 B1 * | 6/2004 | McKillop et al. | 700/230 |
| 6,813,587 B2 | 11/2004 | McIntyre | |
| 6,816,815 B2 | 11/2004 | Takayama | |
| 7,062,343 B2 | 6/2006 | Ogushi | |

(Continued)

FOREIGN PATENT DOCUMENTS

EP 1150185 A1 10/2001

(Continued)

OTHER PUBLICATIONS

European Patent Office, International Search Report issued in corresponding PCT Application serial No. PCT/US2007/086402 dated Jun. 12, 2008.

(Continued)

*Primary Examiner*—Gene Crawford
*Assistant Examiner*—Ramya Prakasam
(74) *Attorney, Agent, or Firm*—Kathleen K Bowen; Alvin T. Rockhill (57) ABSTRACT

A remote conveyor belt monitoring system for monitoring an operation of a conveyor belt at a first geographic location. A local HMI is operable to acquire and store data representing conveyor belt conditions and operating characteristics. First and second computers at different geographic locations acquire the data via an internet. Thus, data relating to the operating conditions of the conveyor belt can be remotely consolidated and monitored by computers at different global locations.

5 Claims, 5 Drawing Sheets

U.S. PATENT DOCUMENTS

2003/0135381 A1* 7/2003 Mathiesen et al. ............. 705/1
2004/0158474 A1 8/2004 Karschnia et al.

FOREIGN PATENT DOCUMENTS

EP 1276026 A1 1/2003
WO 03040882 A2 5/2003

OTHER PUBLICATIONS

Huang Min, A Real-Time Condition Monitoring and Fault Diagnosis System for Steelcord Belt Conveyors, Bulk Solids Handling, (2006), pp. 330-333, vol. 26.

Splice Monitoring System (SMS), 4 Pages, Rescan Pty Ltd.

Land Coal Fire Detection, (2005), 2 Pages, Land Instruments International.

David Gallagher, Low Rolling Resistance for Conveyor Belts, Goodyear Conveyor Belt Products Technology in Motion, (Oct. 2000), 23 Pages.

* cited by examiner

FIG-6

REMOTE CONVEYOR BELT MONITORING SYSTEM AND METHOD

TECHNICAL FIELD

This invention relates generally to conveyor belts and, more particularly, to a monitoring system that permits an automatic collection data relating to an operation of a conveyor belt.

BACKGROUND

In a multitude of commercial applications, it is common to employ a heavy duty conveyor belt for the purpose of transporting product and material. The conveyor belts so employed may be relatively long, for example, on the order of miles, and represent a high cost component of an industrial material handling operation. Such conveyor belts are often used to transport bulk material below and/or above ground, for example, in mining applications, which are often located in geographically remote locations. T he conveyor belts and respective drives are susceptible to normal wear and tear as well as damage firm the material being transported and/or harsh environmental conditions. In the event the conveyor belt or its drive system suffers catastrophic damage or otherwise become inoperable, the costs of repairing the conveyor belt, cleaning up spilt material and the downtime are substantial.

Thus, it is desirable to be able to first, predict a potential conveyor belt failure and second, stop the conveyor belt operation as soon as possible after a catastrophic failure has occurred. It is known to monitor various conveyor belt operating conditions and states, for example, belt position, speed, load, tension, rolling resistance, temperature, as well as detect a failure of a belt splice and the occurrence of a rip in the conveyor belt. Such monitoring of the conveyor belt operating conditions and states helps to detect conditions that may lead to belt damage and/or a catastrophic failure. Thus, there is currently some capability of quickly stopping a conveyor belt in the event of a catastrophic failure, for example, using rip detection; and there is some capability of detecting other potential failures. However, there are several disadvantages to the current systems.

First, current monitoring and analysis of conveyor belt operating conditions and states is performed at a site generally in the locality or vicinity of the conveyor belt. Further, current monitoring is generally analyzed most often by a user of the conveyor belt; however, the user often has less or more limited technical knowledge about the conveyor belt and its operation than., for example, a supplier of the conveyor belt system. Thus, since it is very expensive to bring a more knowledgeable technical person to the geographic location of the conveyor belt system, the ability to diagnose potential problems and take preventative measures is relatively limited with respect to any particular installed conveyor belt system. Further, the collection of data is generally limited to the operation of a single conveyor belt system; and there is no effective capability for collecting conveyor belt operating data from conveyor belt systems at geographically different sites. In addition, with such site-based systems, it is difficult to obtain and timely analyze data permitting an operational life of a conveyor belt to be maximized.

Hence, there is a need to expand the capabilities of current systems to permit a more comprehensive collection of conveyor belt operating data and permit that data to be analyzed and accessed by people with different interests at different global locations remote from the vicinity of the conveyor belt system.

SUMMARY

The present invention provides a remote conveyor belt monitoring system having numerous advantages. First, the remote conveyor belt monitoring system may readily allow authorized persons to monitor conveyor belt conditions and operations from remote locations. Thus, the most qualified technical persons, regardless of their location, may be called upon to monitor conveyor belt operations and provide a more efficient diagnosis of existing and potential problems. Further, the monitoring system may allow others persons who currently have little, a delayed or no access to operational data to access operational data with minimal delay. Such persons may include administrative, management and maintenance persons of a user who are not normally located at the site of the conveyor belt system. In addition, with the remote conveyor belt monitoring system, offsite sales and technical persons of a supplier of the conveyor belt system, offsite third party service providers, distributors and other offsite authorized persons having an interest in the proper operation of the conveyor belt system may have access to conveyor belt operating data with minimal delay.

Further, the remote conveyor belt monitoring system of the present invention may permit conveyor belt operating conditions and states to be automatically monitored and remotely stored over the useful life of the conveyor belt. Such storage of data over the long term permits more effective statistical processing of quality and thus, facilitates more effective problem diagnosis and preventative maintenance. In addition, operating data from conveyor belts at different geographic locations may be monitored and collectively stored in a common database. Differences in operating data from different conveyor belt systems can be analyzed to identify potential problems or improvements in the conveyor belt design. A greater amount of operating data from different conveyor belt systems may help to extend or maximize a conveyor belt's life by improving statistical sampling for the purposes of quality analysis, improving preventative maintenance practices and improving conveyor belt design. The conveyor belt monitoring system of the present invention may be especially useful to a parties who own, lease, or offer a maintenance service for a conveyor belt system.

More specifically, in one embodiment, the invention provides a remote conveyor belt monitoring system for monitoring an operation of a conveyor belt system at a first geographic location. The conveyor belt system has a conveyor belt, a conveyor belt control operable to start and stop the conveyor belt, and a conveyor belt condition sensing system producing first data representing conveyor belt conditions and operating characteristics. A human-machine interface ("HMI") is at the first geographic location and is operable to acquire and store the first data in a first database. The HMI also generates and displays further data representing trends relating to the conveyor belt. A first computer, at a location geographically remote from the first location, is operable to acquire and store the first data in a second database. A second computer, at a location geographically remote from the first location, is operable to acquire and display the first data and further data representing trends relating to the conveyor belt.

In further aspects of the invention, the first data may be acquired by the HMI over a network. For example, the first data may be acquired by the first computer over a data communications systems, for example, an internet, and the first data may also be acquired by the second computer over the data communications system.

These and other objects and advantages of the present invention will become more readily apparent during the following detailed description taken in conjunction with the drawings herein.

DEFINITIONS

"Supervisory control and data acquisition" ("SCADA") system means a software system for gathering, analyzing and storing current operational data.

"Human-machine interface" ("HMI") means a programmable processor-based interface that is operable with a SCADA system and a web browser. The HMI provides a graphical user interface that may permit a user to command the operation of a conveyor belt as well as collect, monitor and display conditions relating to the conveyor belt and its operation.

"Geographically remote locations" means locations that are in different cities, regions, states, provinces, countries or continents.

"Data communications system" means any combination of wired and/or wireless communications links for sending and receiving data.

"Internet" means a data communications system accessible from geographically remote locations and made up of any set of interconnected networks of computers.

"Personal computer" ("PC") means any commercially available computer or device that has a processor running any applicable operating system capable of hosting a web browser or connecting to another data communications system, for example, a desktop or laptop computer, a PDA, a telephonic communications device or other device.

DETAILED DESCRIPTION OF THE ILLUSTRATIVE EMBODIMENTS

Figure 1:
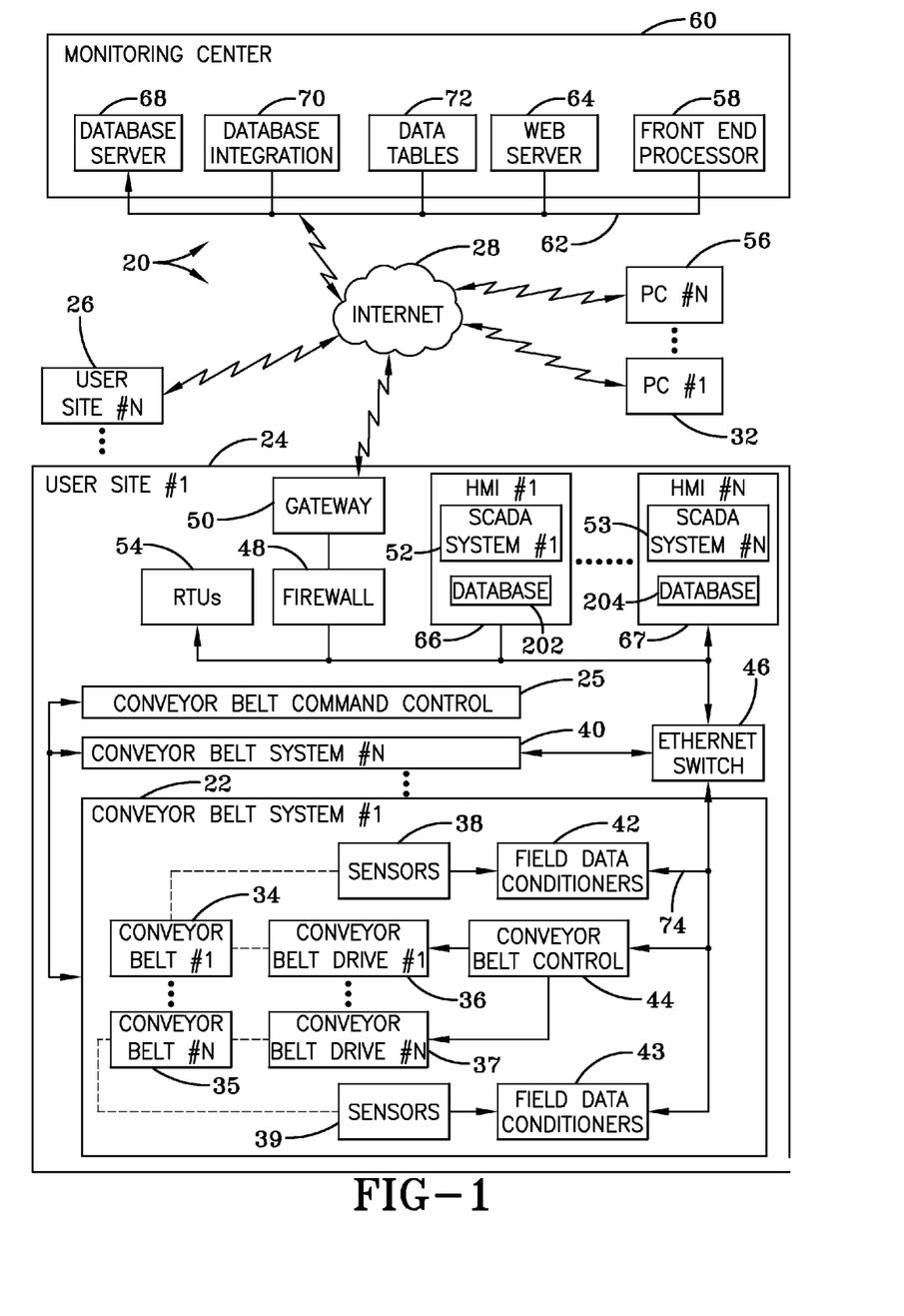
FIG. 1 is a schematic block diagram of an exemplary embodiment of a remote conveyor belt monitoring system.

Referring to FIG. 1, an exemplary embodiment of a remote conveyor belt monitoring system 20 is operable with at least one conveyor belt system 22 that is generally operated by a known conveyor belt command control 25 at a user site 24. The conveyor belt monitoring system 20 includes a communications system 28, for example, an internet, a monitoring center 60, remotely located programmable computers 32, 56, for example, personal computers ("PCs"), and other devices necessary to send and receive data from the user site 24 and the data communications system 28. Within the conveyor belt system 22, a conveyor belt condition sensing system made up of sensors 38 and Field data controllers 42 is in electrical communications with the internet 28. Data relating to conditions and operating characteristics of the conveyor belt 34 and the conveyor belt drive 36 are transferred via the internet 28 to a database in the monitoring center 60. Further, the PCs 32, 56 have respective web browsers that permit any authorized person at any global location to use the PCs 32, 56 to access data in the monitoring center. Such persons may be employees of the user located remotely from the user site 24, employees of a supplier or manufacture of the conveyor belt system 22, a service supplier, or any other person authorized by the user.

The user site 24 is generally a geographic area or locality, a first geographic location, that the user chooses to structure as a single site for monitoring purposes and often has all of the equipment necessary for independent operation of the conveyor belt systems 22, 40. Often such sites are for handling a bulk material, for example, coal. There may be other user sites 26, for example, other sites for handling a bulk material, that may or may not be geographically remote from the user site 24. If they are geographically remote, they are at a second geographic location, or a third geographic location—or an "N" geographic location corresponding to the User Site "N" (ref FIG. 1). The user sites 24, 26 may be owned by the same or different entities. For purposes of this description, the other user sites 26 are assumed to be generally similar to the user site 24; and therefore, only the user site 24 is described in detail. The user sites 24, 26 may be owned by the same or different entities. For purposes of this description, the other user sites 26 are assumed to be generally similar to the user site 24; and therefore, only the user site 24 is described in detail. The user site 24 often has other conveyor belt systems 40 in addition to the conveyor belt system 22. The conveyor belt systems 40 are generally substantially similar to the conveyor belt system 22; and therefore, only the system 22 will be described in detail. Further, the conveyor belt systems 22, 40, may have additional conveyor belts 35 and associated conveyor belt drives 37 substantially similar to the conveyor belt 34 and associated drive 36. Further, each of the additional conveyor belts 35 may have a separate but similar set of sensors 39 and associated field data conditioners 43. Therefore, in the discussion to follow, any reference to the conveyor belt 34 and conveyor belt drive 36 shall be interpreted to also include, as appropriate, the other conveyor belts 35 and associated drives 37, sensors 39 and field data conditioners 43.

Field data conditioners 42 provide an initial signal conditioning and processing of signals From the sensors 38. The nature of the processing is unique to a particular sensor signal but is not limited to a state of the particular sensor. The processing may include diagnostics processing of the sensor and its associated drive and interface as well as diagnostics processing relating to the conveyor belt operation. The field data conditioners 42 often comprise several printed circuit boards, wherein each printed circuit board has a number of inputs and Outputs and a central processing unit ("CPU") that is programmed to uniquely process output signals from particular sensors 38. For example, in one exemplary embodiment, field data conditioner board may include 8 12-bit surge protected analog inputs, 8 opto-coupled digital inputs, 2 opto-coupled high speed digital inputs, 8 open-collector digital outputs, 1 quadrature decoder, a network interface using, for example, a network transmission control protocol/internet protocol ("TCP/IP") and multiple serial interfaces. The board further includes a CPU, for example, an RCM3400 CPU commercially available from Rabbit Semiconductors. The CPU may be programmed to allow a simultaneous pulling of the field data from the sensors 38 by two different devices using either multiple serial interfaces or a TCP/IP. The number of inputs and outputs on a field data conditioning board is fixed, and therefore, a number of field data conditioning boards are used that is required to handle the number and type of inputs provided by the sensors 38, the processing for the sensor outputs and the number and type of outputs desired.

Outputs from the field data conditions 42 are also applied to a conveyor belt control 44 that is generally operative to turn the conveyor belt drive 36 on and off. A network switch 46, for example, an Ethernet switch, also receives data from the field data conditioners 42 in the form of digital output signals, which permits a routing of that data to a remote site, for example, a monitoring center computer system 60 via an RTU 54, a fire wall 48, a gateway 50 and the internet 28. The Ethernet switch 46 is an industrial graded managed switch configured to support interconnection of Ethernet data coming from the field data conditioners 42.

A browser-based human-machine interface ("HMI") 66 includes a supervisory control and data acquisition ("SCADA") system 52 The HMI 66 is also connected to the Ethernet switch 46. In this example the SCADA system 52 has a WINDOWS-based graphical user interface, database integration, history trend charts and a MODBUS-RTU communications protocol that supports either serial communications or a network transmission control protocol/internet protocol ("TCP/IP") to connect the SCADA system 52 with a remote terminal unit ("RTU") 54 in a known manner. In the exemplary embodiment, other HMIs 67 that have respective SCADA systems 53 may be used. In some exemplary embodiments, one HMI and SCADA system is used for each of the conveyor belt systems 22, 40. In other exemplary embodiments, an HMI and SCADA system may be used for each of the conveyor belt drives 36, 37.

In the exemplary embodiment of FIG. 1, the conveyor belt monitoring system 20 may be designed to be global in nature, that is, designed to accommodate a user site 24 located in, for example, South America or Asia and a geographically remote monitoring center computer system 60 that may or may not be on another continent. In addition, the operation of the various user sites may be monitored by the PC 32 that may or may not be located at other geographically remote locations, for example, in North America or Europe. Other PCs 56 may be utilized by others at the same or different global locations, such as, different parties within the user, a supplier or manufacture of the conveyor belt system 22, a service supplier, or any other entity authorized by the user. To achieve reliable operations on a global basis, the gateway 50 utilizes a transceiver commercially available from BGAN that provides satellite based communications commercially available from INMARSAT. Thus, the gateway 50 provides global internet access at broadband speeds.

Each of the RTUs 54 is a single board computer running a LINUX operating system. Each RTU board has a serial port and utilizes an RS 232 interface that allows the RTU board to communicate with the field data conditioners 42 using the MODBUS-RTU protocol. The MODBUS-RTU protocol has become a defacto communication standard in the industry and is commercially available as a MODICON product from Schneider Electric. Each RTU board further provides a network interface and appropriate software drivers to send and receive data to and from a first computer or front end processor ("FEP") 58 via the internet 28 utilizing a MODSAT communication protocol. Often an RTU computer board will be used for each field data condition board used. In an alternative embodiment, other wireless connections, for example, a cell phone connection, may used to transfer data between the FEP 28 and the PC 32.

The FEP 58 is part of the monitoring center computer system 60 that is often located geographically remote from the user sites 24, 26 and PCs 32, 56; and thus, the monitoring center computer system 60 communicates with the user sites 24, 26 and PCs 32, 56 via the internet 28 or other wireless connection. The monitoring center computer system 60 has a local communications network 62, for example, an intranet, a local area network ("LAN"), or other-appropriate network using wired or wireless devices. The network 62 provides communication between the Front end processor 58, a web server 64, a database server 68, database integration programs 70 and data tables 72. The FEP 58 uses the webserver 64 to facilitate communications over the internet 28 with the PCs 32, 56 and gateway 50.

The FEP 58 also has the MODBUS communications protocol and it accepts transmission control protocol ("TCP") ports responding to data polls from the database integration software 70. The TCP port accepting TCP connections is designated a logic channel, and many logic channels can be configured to improve front end processor performance if a number of RTUs 54 have to be polled. After a TCP connection is established, the FEP 58 executes a login procedure downloading operating parameters for the RTUs 54; and thereafter, the FEP 58 communicates with the RTUs 54 using the MODSAT communication protocol.

The field data conditioners 42 sample signals from the sensors 38 on a periodic basis. Corresponding digital output signals are subsequently released via MODBUS slave servers at respective field data conditioners 42 and connected with a local communications network 74, for example, an intranet, a LAN such as an Ethernet, or other appropriate network using wired or wireless devices. The local network 74 may be implemented using a cable, optic fiber, wireless links or other communication link that is suitable for a particular user site 24 The field data conditioners 42 also implement a network transmission control protocol/internet protocol ("TCP/IP") with respective MODBUS slave servers through at least two TCP ports so that both the local SCADA system 52 and remote FEP 58 can acquire field data simultaneously.

During system initialization the FEP 58 downloads operating parameters for the RTUs 54 so that only a minimal local configuration is needed. The RTUs 54 use a mechanism of unsolicited report of variables and report by exception algorithms to optimize bandwidth and update data to the SCADA system 52 and FEP 58 with minimum delay. The FEP 58 and RTUs 54 are built over a UNIX operating system to provide desired levels of connectively, stability, reliability and availability that are necessary for unassisted continuous operation.

Figure 2:
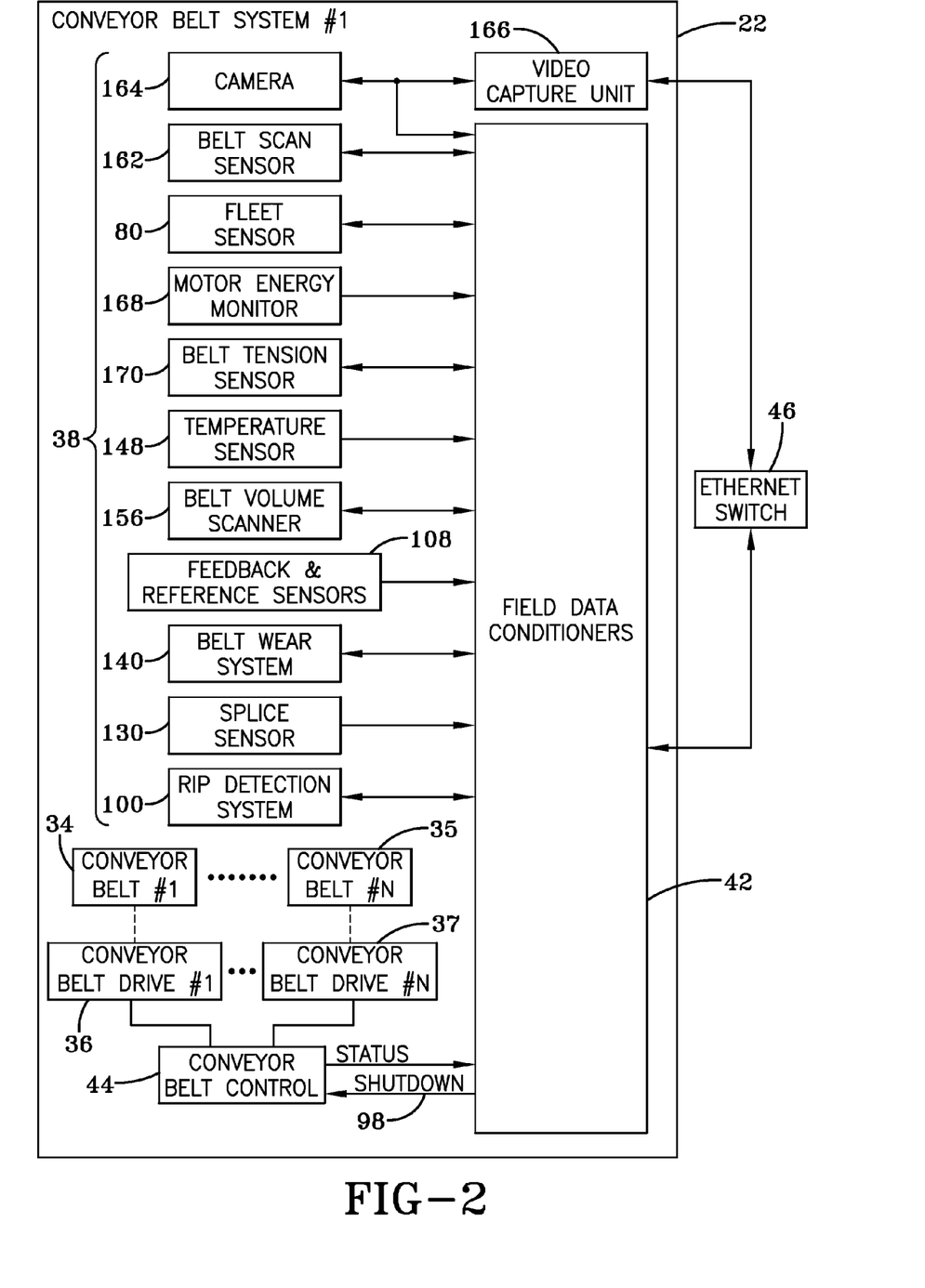
FIG. 2 is a schematic block diagram of an exemplary embodiment of conveyor belt system that may be used with the remote conveyor belt monitoring system of FIG. 1.
Figure 3A:
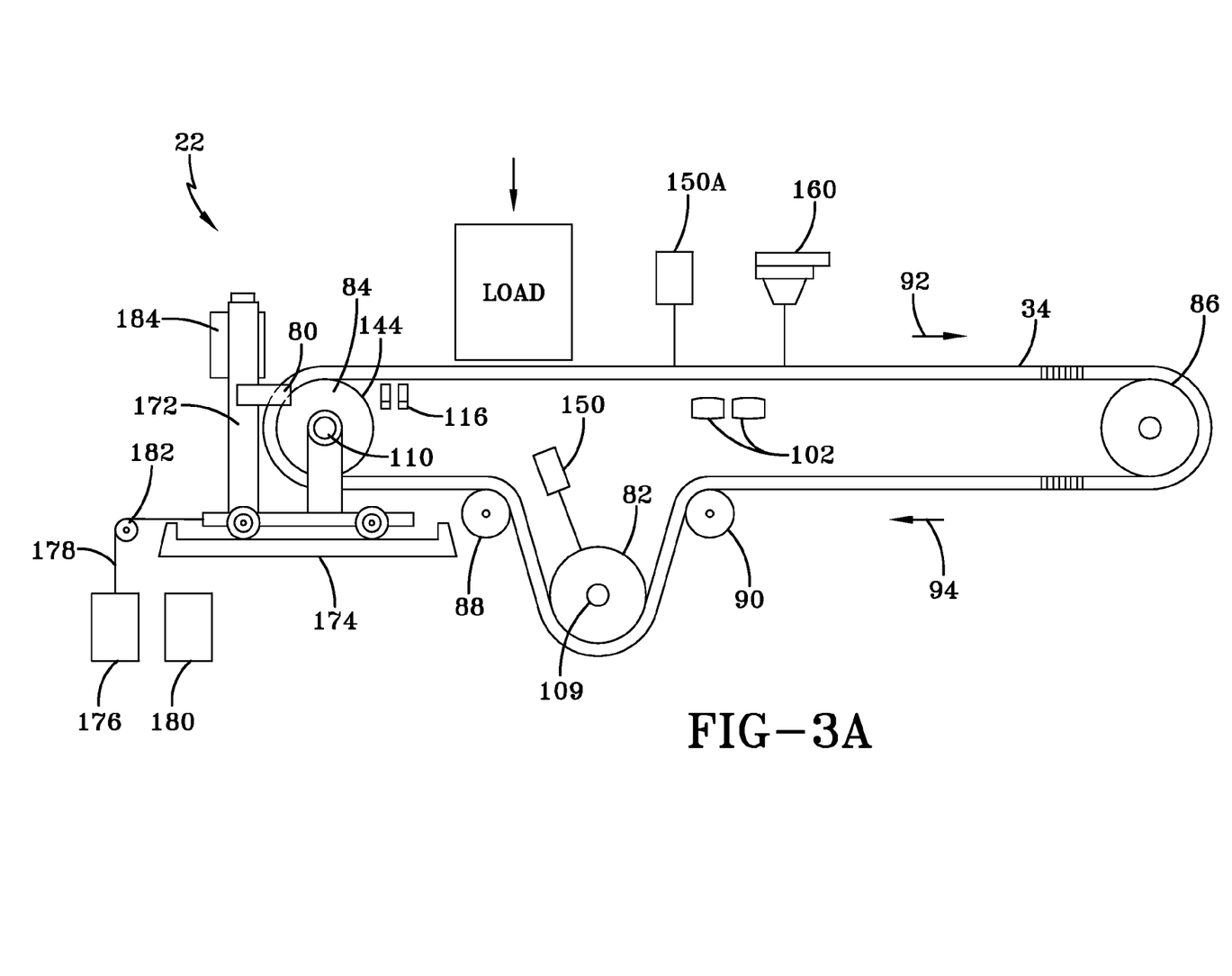
FIG. 3A is schematic diagram of an exemplary embodiment of an above-ground conveyor belt system that may be used with the remote conveyor belt monitoring system of FIG. 1.

Referring to FIG. 2, sensors 38 associated with one exemplary embodiment of a conveyor belt system 22 are shown schematically in more detail. A fleet or tracking sensor 80 is used to track changes in a transverse position of a conveyor belt 34 on a pulley. For example, as shown in FIG. 3A, a conveyor belt system 22 may have a drive pulley 82, tail pulley 84, a head pulley 86 and other pulleys 88, 90 for directing motion of the conveyor belt 34. If respective axis of rotation of the pulleys 82-90 are not substantially parallel, the conveyor belt 34 will tend to move in a direction transverse to its motion as indicated by the arrows 92, 94. To monitor such transverse motion, a fleet sensor 80 may be implemented by one or more sensors that are located adjacent lateral edges of the conveyor belt 34 near the head pulley 84. Such proximity sensors are operable with associated field data conditioners to provide digital output signals representing position(s) and/or changes of position(s) of one or both edges of the conveyor belt 34. In one embodiment, the fleet sensor 80 is able to detect belt edge motion of up to six inches. Thus, as the conveyor belt lateral edges move transversely over an external surface 144 of the tail pulley 84, changes in the respective lateral edge positions may be stored in the SCADA system 52 and/or the database server 68. Further, the current conveyor belt edge positions may be observed locally using the HMI 66 and/or globally using the PCs 32, 56. Further, error messages or alarms may be automatically generated if the conveyor belt edge positions reach a threshold value.

The number of fleet sensors 80 deployed over the various pulleys 82-90 is variable and depends upon the application, the tendency of the conveyor belt 34 to move transversely over a pulley and other factors. In some applications, the fleet sensor 80 may provide output signals representing different magnitudes of belt movement that result in different levels of action. For example, upon detecting a first magnitude of transverse belt movement, a sensory perceptible alarm, for example and audible or visual alarm or error message may be activated at a location within the user site 24 drawing attention to the transverse belt motion condition. The fleet sensor 80 may be sensitive to further magnitudes of belt movement to provide other alarms indicating a more severe condition thereby permitting the user to decide what action is appropriate. Upon detecting a great magnitude of conveyor belt motion, the field data conditioners 42 may produce an output signal on line 98 commanding the conveyor belt control 44 to stop the conveyor belt 34. The choice of technology for the fleet sensor 80 may be determined on an application-by-application basis; and the fleet sensor 80 may be implemented using either visual, ultrasonic, infrared, magnetic, mechanical or other commercially available technologies.

A rip detection system 100 of FIG. 2 has sensors 102 in FIG. 3A that are effective to detect a rip in the conveyor belt 34. An exemplary rip detection system 100 is commercially available from the assignee of the present invention as a SENSOR GUARD system. An applicable rip detection system is also shown and described in U.S. patent application Ser. No. 11/421,224, filed May 31, 2006, entitled Digital Processor Sensor Loop Detector and Method; and the entirety of which is hereby incorporated by reference herein.

An output from the rip detection system 100 may cause the field data conditioners 42 to provide and output on line 98 causing the conveyor belt control 44 to turn off the conveyor belt drive 36 and stop the conveyor belt 34. In addition, an output from the rip detection I 00 causes the field data conditioners 42 to make a conveyor belt rip signal available to the SCADA system 52 and the FEP processor 58 via the network switch 46. The SCADA system 52 is effective to register the position of the conveyor belt 34 at the time that the output from the rip detection system 100 was detected and provide appropriate alarm and error messages.

As shown in FIG. 2, feedback and reference sensors 108 may be employed in different sensing subsystems. Referring to FIG. 3A, in one example, the feedback and reference sensors may be one or more optical coders 109, 110 that may be connected to respective rotating pulleys, for example, drive pulley 82 and tail pulley 84. Outputs of the encoders 109, 110 may represent position, velocity and or angular direction in a known manner. An output of the encoder 110 may be utilized to determine a length and/or a linear velocity of the conveyor belt 34. With the encoder 110, a current position is determined by counting incremental encoder measurements from a reference or datum point.

Figure 4A:
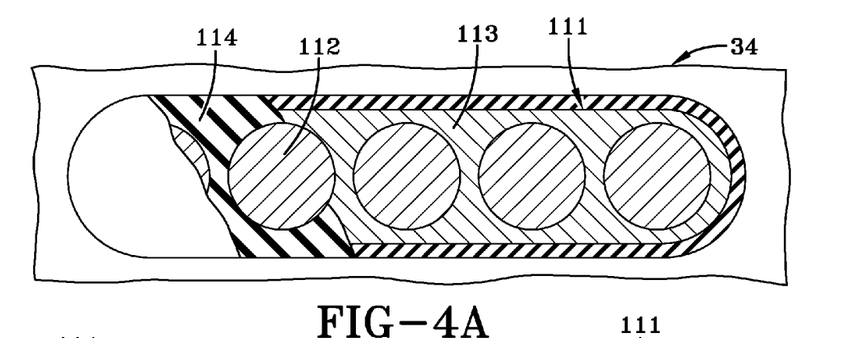
FIG. 4A is a top elevation view of an exemplary embodiment of a target magnet sensor array that may be used with the conveyor belts of FIG. 1.
Figure 4B:
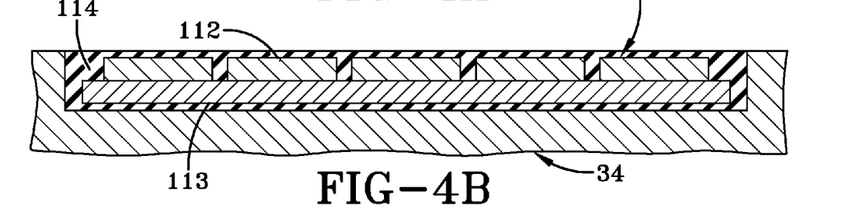
FIG. 4B is a cross-sectional side view of the exemplary embodiment of a target magnet sensor array that may be used with the conveyor belts of FIG. 1.

As shown in FIGS. 4A and 4B, a reference point may be established by using an assembly of target magnets 111. A linear array of ferrite magnetic discs 112 are mounted on a base 113 that, in turn, is mounted transversely in an upper surface of the conveyor belt 34 and protected by a protective encapsulation 114. The target magnet assembly 111 must be small enough to avoid conflicts with conveyor belt metal detectors, but large enough for accurate detection. As shown in FIG. 3A, the target magnets 111 on the moving conveyor belt 34 are detected by a proximity sensor 116, for example, a magnetic sensor, as the magnets 111 move past the sensor 116. Upon the magnetic sensor 116 detecting the target magnets 111, a reference or datum signal is provided by find data conditioners 42, which may be used as a starting point for belt length measurement using the signals from the encoder 110. For purposes of belt length measurement, generally only one set of target magnets 111 is utilized over a length of a conveyor belt 34. However, with longer conveyor belts if it is desirable to obtain a belt length measurement more often, multiple sets of target magnets 111 may be utilized. It should be noted that in measuring belt length, the encoder 110 on nondriven tail pulley 84 is used instead of the encoder 109 on driven pulley 82, so that belt slippage is not a factor. Further, the reference or datum signal used for belt length measurement may also be used by the field data conditioners 42 for other calculations or measurements.

Figure 5:
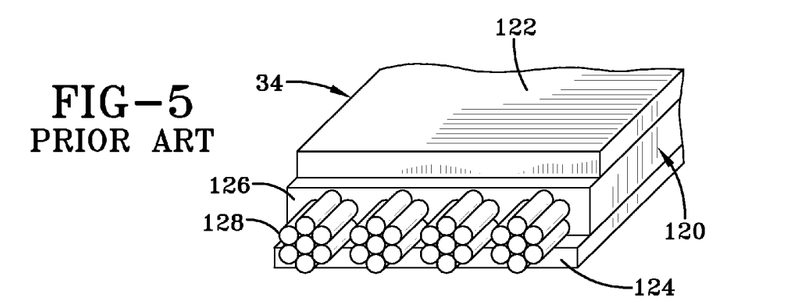
FIG. 5 is an exemplary schematic end view illustration of a known conveyor belt.
Figure 6:
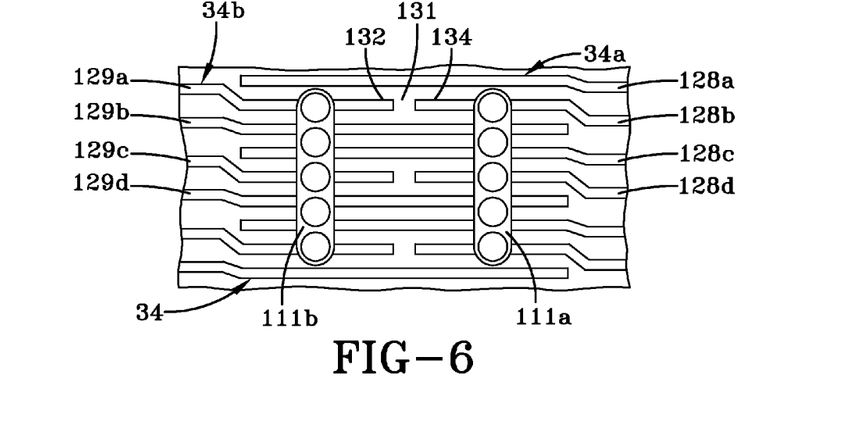
FIG. 6 is an exemplary schematic top view illustration of a small portion of a splice between conveyor belts using the target magnet sensor array of FIG. 4A.

Referring to FIG. 2, a splice sensor 118 may also use the target magnets 111 shown and described with respect to FIGS. 4A, 4B to monitor a status of a conveyor belt splice. Referring to FIG. 5, a known conveyor belt 34 often consists of two parts, that is the carcass 120 and top and bottom covers 122, 124 respectively. The carcass 120 is responsible for load tension, and the covers 122, 124 carry the product being conveyed and protect the carcass 120 from damage. In high tension conveyor belts, the carcass 120 consists of steel cords 128 placed side by side and embedded in a rubber core 126. A manufactured length of a single conveyor belt roll may be about 350 meters, and larger conveyor belts may be comprised of multiple conveyor belt rolls. With such larger conveyor belts, individual conveyor belt rolls 34a, 34b are spliced together, and FIG. 6 is a schematic showing of a small portion of a splice. Steel cords ends 128a, 128b, 128c, 128d are exposed from one end 134 of conveyor belt roll 34a; and steel cords ends 129a, 129b, 129c, 129d are exposed from one end 132 of conveyor belt roll 34b. The steel cord ends 128a-128d and 129a-129d are interlaced and shown; and a rubber compound is placed around the cords and cured in a known manner. Over the length of the splice, the rubber compound handles 100% of the tension load, whereas in the remainder of the length of the conveyor belts 34a, 34b, the tension load is handled by the steel cords 128, 129. If there is a failure of conveyor belt splice, the failure is catastrophic and results in substantial costs in material clean up as well as conveyor down time.

To detect a splice beginning to separate, a splice sensor 130 (FIG. 2) may be implemented by mounting target magnet arrays 111a, 111b at positions associated with the respective ends 134, 132 of the conveyor belts 34a, 34b, respectively. In practice, the target magnet arrays 111a, 111b may be separated along the splice by a distance in a range of about 10-40 feet. Assuming the conveyer belt is moving from left to right as viewed in FIG. 6, the magnetic sensor 116 (FIG. 3A) or a similar sensor may be used to first detect the target magnet array 111*a*; and the field data conditioners 42 then begin counting high resolution pulses from the encoder 110 mounted on the nondriven tail pulley 84. Upon the magnetic sensor 116 sensing the second target magnet array 111*b*, the accumulated count of encoder pulses represents the distance between the target magnet arrays 111*a*, 111*b*. During subsequent loops of the target magnet arrays 111*a*, 111*b* past the magnetic sensor 116, the field data conditioners 42 that are able to detect small changes in subsequent accumulated counts that represent an elongation of the splice. An elongation of the splice is a precursor to a splice failure. The field data conditioners 42 thus provide data representing a status of the belt slice available to the SCADA system 52 and/or FEP 58, which, in turn, may generate appropriate error messages and alarms as a change in a distance between the roll ends 132, 134 is detected. The field data conditioners 42 may also provide an output on line 98 causing the conveyor belt 34 to stop upon detecting a separation of the conveyor roll ends 132, 134.

The encoder 109 mounted on the drive pulley 82, and the encoder 110 mounted on the nondriven pulley 84 may be used to provide an indication of a slippage or sliding of the conveyor belt 34 with respect to the drive pulley 82. If the conveyor belt 34 is slipping with respect to the drive pulley 82, the linear velocity of the conveyor belt 34 will be less than the circumferential linear velocity of the drive pulley 82. Further, the conveyor belt 34 will be driving the nondriven pulley 84 at the lesser angular velocity. Therefore, by comparing the angular velocities measured by the encoders 109, 110, the field data conditioners 42 can provide a digital output signal representing a difference between those two angular velocities, which difference is indicative of slippage of the conveyor belt 34 with respect to the drive pulley 82. The SCADA system 52 and the field data conditioners 42 are able to generate messages and/or alarms with respect to conveyor belt slippage.

Referring to FIG. 2, a belt wear system 140 may be used to periodically sample belt thickness, which i may be used for analysis to guide operational and maintenance services. As shown in FIG. 3A, a belt wear sensor 142, for example, a high precision laser measurement transmitter, may be used to measure a change in belt thickness over time. In one embodiment shown in FIG. 3B, the laser measurement transmitter 142 is mounted inside a housing 184 that, in turn, is mounted on a sliding nut 186 carried by a ball screw 188. The screw 188 is rotatably mounted in vertical posts 189 that are supported by the takeup carriage 172, which, in turn, rotatably supports the tail pulley 84. An actuator 190, for example, a stepping motor, rotates the screw 188 to move the housing 184 and laser measurement transmitter 142 transversely across a width of the conveyor belt 34. In response to commands from the SCADA system 52, the field data conditioners 42 are operable to command the motor 190 to move the laser transmitter 142 to any desired transverse location across the width of conveyor belt 34. In one exemplary embodiment, the housing for the laser measurement transmitter 142 has a movable gate 192 and a blower or fan 194. Before a thickness reading cycle is started, the gate 192 is opened and the blower 194 is turned on to create a positive pressure within the housing 184, thereby protecting the laser measurement transmitter 142 by preventing any dirt, dust, moisture or other contaminants from entering the housing. The operation of the laser measurement transducer 142 and associated stepping motor 190 is commanded by one of the field data conditioners 42 associated with the laser measurement transmitter 142.

Figure 3B:
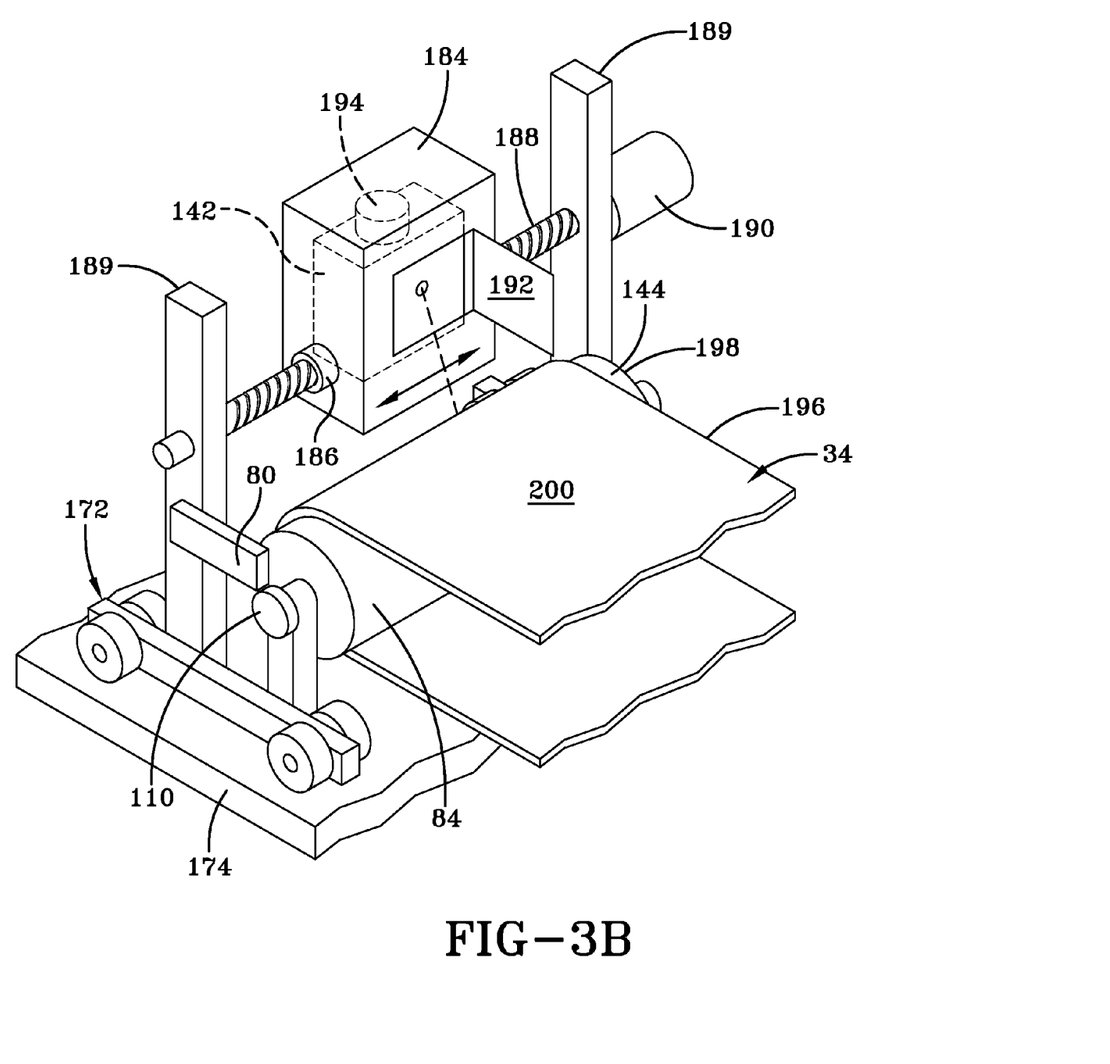
FIG. 3B is schematic diagram of an exemplary embodiment of a belt wear sensor that may be used with the remote conveyor belt monitoring system of FIG. 1.

In a calibration cycle, the laser measurement transmitter 142 is first located at a home position, for example, beyond a lateral edge 196 of the conveyor belt 34 and near one end of the tail pulley 84. The laser measurement transmitter 142 is then operated to measure a distance to an outer circumference 144 of the tail pulley 84. This distance measurement is identified as a roller reference and may be subsequently used to determine a thickness of the conveyor belt 84. In a subsequent measurement cycle, the laser measurement transmitter 142 is positioned at a desired location along the width of the conveyor belt 34; and current distance measurements are made with respect to a surface 200 of the moving conveyor belt 34. Samples of current distance measurements are continuously taken over a selected length of the conveyor belt 34, for example, 10 feet, 25 feet, 100 feet or other desired length. Multiple current distance measurements are made in a manner that is consistent with known statistical processing sampling techniques. The laser measurement transmitter 142 is then moved to other approximately equally spaced locations across the conveyor belt width and the sampling process is repeated. It should be noted that during the above sampling process, the conveyor belt 34 is shifting transversely on the pulley 84. Therefore, prior to each time the laser measurement transmitter 142 is commanded to a new position, the output from the fleet sensor 80 is used to compensate for the transverse motion of the conveyor belt 34.

A conveyor belt thickness is determined by the field data conditioners 42 subtracting a distance measurement from the roller reference distance. The field data conditioners 42 may also be used to determine maximum and minimum conveyor belt thicknesses across the width of conveyor belt 34. It should be noted that in some applications, a start of a splice separation, as described with respect to FIG. 6, may also result in a reduction of belt thickness; and the laser measurement transmitter 142 may be used to detect or to confirm an elongation of a splice. While a laser measurement transmitter 142 is shown as one embodiment to implement the belt wear system 140, in other embodiments, other devices, for example, ultrasonic, optical, magnetic or infrared devices, that can provide distance measurements to a desired accuracy and within a desired response time may be used.

As shown in FIG. 2, a temperature sensor 148 may be used to provide, via the field data conditioners 42, an early warning of thermal hot spots on the conveyor belt 34. In a worst case scenario, the field data conditioners 42 may use a temperature set point that is calibrated to represent combustion or a fire on the conveyor belt 34. Upon sensing a temperature of that magnitude, the field data conditioners 42 may provide an output signal on line 98 causing the conveyor belt control 44 to stop the conveyor belt 34. In one exemplary embodiment, the temperature sensor 148 may be an infrared spot temperature transmitter 150 shown in FIG. 3A. The transmitter 150 may be mounted in a rugged housing that is provided with a gate and blower and is operable in a manner similar to that described with respect to the laser measurement transmitter 142.

Further, temperature sensors may be mounted at different locations depending on the application. For example, in one exemplary embodiment, the temperature sensor 150 may be mounted at locations where a higher temperature may be reasonably expected due to a failed operation. For example, a temperature sensor 150 may be mounted adjacent conveyor belt 134 where it extends over the drive pulley 82. In the event of conveyor belt slippage with respect to drive pulley 82, the temperature of the conveyor belt 34 will increase, which will be detected by the temperature sensor 150 and processed by the field data conditioners 42. In another exemplary embodiment, a temperature measurement scanning system 150*a* using an infrared line scanner is able to rapidly scan a width of the conveyor belt 34 to detect spot objects and other problems. Such a temperature measurement scanning system is especially applicable when the conveyor belt 34 is carrying a combustible material, and such a scanning system 150a is commercially available as a conveyor fire detector from Land Instruments International. In further applications, an output from a temperature sensor 148 representing an excessive temperature may be detected by the SCADA system 52 that, in turn, is effective to automatically command a discharge of a Fire suppressant under the temperature sensor. The temperature sensor 148 may be any type of sensor that is effective to detect thermal events and provide a timely signal in response to those events.

Referring to FIG. 2, a belt volume scanner 156 may be used to estimate a weight of material on the conveyor. One implementation of the belt volume scanner 156 is a distance measuring device 160 of FIG. 3A, for example, a second laser measurement transmitter similar to that described with respect to the laser measurement transmitter 142 of FIG. 3B. Again, as previously described, the second laser measurement transmitter may be mounted to scan back and forth across a width of the conveyor belt 34 in a manner similar to that described with respect to the laser measurement transmitter 142. The device 160 is mounted to measure distance in a vertical direction substantially perpendicular to the belt travel designated in arrow 192. In a calibration cycle, the distance measuring device scans a width of an empty conveyor belt 34 that provides a datum reference for an empty conveyor. Thereafter, the device 160 is used to scan across a width of a load be carried by the conveyor belt 34. The field data conditioners 42 are able to determine the height and width of a load on the conveyor belt 34. The field data conditioners 42 also detect a velocity of the conveyor belt from an Output of the encoder 110 and thus, are able to determine an incremental length of the conveyor belt 34 that passes the scanner 160 over a period of time. With that data, the Field data conditioners 42 are able to determine a volume of material on the conveyor belt over the incremental length. A density value of the material on the conveyor belt 34 may be manually entered and stored in the SCADA system 52. Given the density, the field data conditioners 42 and/or the SCADA system 52 may determine the weight of material over a length of the conveyor belt 34.

As shown in FIG. 2, a further sensor may be a belt scan sensor 162 that is utilized to determine a quality of the conveyor belt. For example, if the conveyor belt 34 is a fabric material belt, the belt scan sensor 162 may be an X-ray scanner. In another embodiment, if the conveyor belt 34 has a steel core construction, the belt scan sensor 162 may be a magnetic scanner that detects damaged steel cores. Such scanners may measure, for example, magnetostatic differential reluctance, magnetic flux leakage at damaged or other magnetic property, and are commercially available from Conveyor Belt Technology, Corp. In either embodiment, in a calibration cycle, the belt scan sensor 162 is first used to scan the belt to obtain baseline data. Alternatively, baseline data obtained by scanning a new belt may be entered into the SCADA system 52; or in a further alternative, a table of baseline values may be entered into the SCADA system 52 that represents different qualitative conditions of a conveyor belt. Thereafter, the conveyor belt being used is scanned with the belt scan sensor 162 to provide current scan data that is compared to the baseline data either by the field data conditioners 42 or the SCADA system 52. The results of the comparison are then used by the field data conditioners 42 or SCADA system 52 to determine a quality level of the conveyor belt being currently used; and appropriate messages and/or alarms are then generated.

A further one of the sensors 38 that may be used to observe the conveyor belt 34 and is a camera 164 that may be an analog or digital video camera. An associated video capture unit 166 may be used to provide images to the network switch 46. Thus, a person using a PC 32, 56 at a remote geographic location can view conveyor belt operation using the camera 164. This is accomplished using an input/output interface of a PC 32, 56 to initiate commands to the FEP 58 to poll data via an RTU 54 from one of the field data conditioners 42 processing data from the camera 164. Digital images of the conveyor belt operation are transferred via the RTU 54 over the internet 28 to the FEP 58 and then, from the FEP 58 over the internet 28 to the PC 32, 56 be used.

Another of the sensors 38 may be a motor energy monitor 168 that is often used to monitor changes in rolling resistance of the conveyor belt. With such a measurement, it is desirable to monitor the energy produced by the motor that is used to move the conveyor belt. To obtain such an energy measurement, it is known to apply strain gages to both sides of a rigid coupling connecting a motor gear box to a drive pulley, which allows only the torsion forces to be measured.

A belt tension sensor 170 is another of the sensors 38 that may be used. Referring to FIG. 3A, the tail pulley 84 is rotatably mounted on the takeup carriage 172 that, in turn, rides on tracks 174. A weight 176 is suspended at an end of a cable 178 that has an opposite end connected to the takeup carriage 172. The weight 176 has a value representing a desired belt tension and thus, applies a force on the tail pulley 84 substantially equal to the desired belt tension. Further, as a length of the conveyor belt 34 changes, for example, becomes longer, the constant belt tension force of the weight 176 causes the carriage 172 to move slightly to the left as viewed in FIG. 3A, thereby talking up any conveyor belt slack. A sensor 180 is positioned with respect to the takeup carriage 174 and is operable to detect any changes of the takeup carnage position along the tracks 174.

In operation, referring to FIG. 1, operation of the conveyor belts 34, 35 in conveyor belt system 22 as well as conveyor belts in conveyor belt system 40 are generally controlled by the conveyor belt command control 25. The sensors 38, 39 are operative to monitor various conveyor belt states and conditions as described above. In some applications, all of the sensors 38 shown and described with respect to FIG. 2 may be duplicated for each of the conveyor belts 34, 35, whereas, in other applications, only selected ones of the sensors 38 may be used with each of the conveyor belts 34, 35. During conveyor belt operation, output signals from the sensors 38 are automatically sampled and stored by the field data conditioners 42, 43. The inputs of the field data conditioners 42, 43 have appropriate input signal conditioners and, in the case of analog inputs, respective analog-to-digital converters to provide desired digital signals. The field data conditioners 42, 43 further provide a processing of the digital signals to provide a desired output as described above. Such processing may require a quadrature decoder conditioner to process outputs from the encoder 110, and the field data conditioners 42, 43 have output signal conditioners to facilitate a connection to a local network 74.

Outputs from the field data conditioners 42, 43 are either critical or noncritical, Critical outputs are those requiring an immediate shutdown of the conveyor belt to minimize any potential damage. As shown in the exemplary embodiment of FIG. 2, critical outputs include, but are not limited to, outputs representing a detected rip in a conveyor belt, a detected temperature that exceeds a threshold value indicative of a fire, a detected splice elongation that exceeds a threshold value, a detected transverse conveyor belt position that is in excess of a threshold value, and other outputs indicating damage to the conveyor belt 34 is occurring or immediately imminent. Such critical outputs result in a signal on a data field conditioner output line 98 and are effective to command a the conveyor belt control 44 to terminate operation of the conveyor belt drives 36, 37 and stop the respective conveyor belts 34, 35. Thus, upon the occurrence of a critical output, the operation of the conveyor belts 34, 35 is automatically terminated by local action independent of the HMIs 66, 67, FEP 58 or the PCs 32, 56. Noncritical outputs from the field data processors 42, 43 do not result in an immediate change in conveyor belt operation and are available to the SCADA system 52 and FEP 58 for subsequent analysis The FEP 58, the HMIs 66, 67 and the Field data conditioners 42, 43 are independently operating processing units; and each can function automatically and independently in the event of a failure of the other units. The SCADA systems 52, 53 in the respective HMIs 66, 67 may automatically poll data via the network switch 46 from the field data conditioners 42, 43; and the SCADA systems 52, 53 automatically maintain respective local database 202, 204 (these would be first databases for User Site #1 (24) and second databases for User site #2, and N databases for User Site #N (26) ref to FIG. 1) of field data conditioner output data associated with local conveyor belt systems 22, 40. In addition, the SCADA systems 52, 53 may also automatically determine and maintain statistical values and historical trends for purposes of quality control, for example, average values of the data over periods of a working shift and/or a day, week, month or other desired period. Thus, with such data, persons at the user site 24 are able to optimize the operation of the conveyor belt systems 22, 40.

The FEP 58 functions independently of the HMIs 66, 67. The FEP 58 may automatically, or in response to commands from the PCs 32, 56, collect data from field data conditioners 42, 43 through respective RTUs 54 at all of the user sites 24, 26; and the FEP 58 automatically maintains data tables 72 representing relatively current states of operating conditions of the conveyor belt system 22. The database integrator 70 automatically gathers data from the data tables 72 for insertion into a database in the database server 68. Thus, the database server 68 consolidates all of the historical data for all of the conveyor belt systems 22, 40 at all of the user sites 24, 26 that may be in geographically remote locations, for example, on different continents. The FEP 28 may also automatically, or in response to specific commands from the PCs 32, 56, pull data from the SCADA systems 52, 53 in the respective HMIs 66, 67 through the RTU's 54. The RTUs 54 handle only current data and do not have any storage capability, and the RTUs 54 utilize exception processing so that only changed data is routed through the RTUs 54.

Persons associated with the PCs 32, 56 may be located anywhere in the world where there is access to the internet 28 and may access any of the data being maintained in the database server 68, the SCADA system 52 or in the data field conditioners 42, 43. For example, tile PCs 32, 56 may be used to automatically, or in response to user inputs, initiate commands over the internet 28 to the FEP 58 to obtain data from the database server 68, or poll data via the RTUs 54 from the field data conditioners 42 or the SCADA systems 52, 53. Such data is then transferred from the FEP 58 to the PCs 32, 56 over the internet 28. Persons using the PCs 32, 56 may be administrative, management and maintenance persons of a user who are not normally located at, or are temporarily absent from, the user sites 24, 26. In addition, with the remote conveyor belt monitoring system 20, offsite sales and technical persons of a supplier or vendor of the conveyor belt systems 22, 40, offsite third party service providers, distributors and other offsite authorized persons may have access to historical and current conveyor belt operating data via one of the PCs 32, 56.

Further, such offsite persons may be able to utilize more comprehensive statistical processing and data analysis techniques than is currently available. For example, with the remote conveyor belt monitoring system 20, a vendor of the conveyor belt systems 22, 40 is able to collect and store data relating to conveyor belt conditions and operations from a large number of conveyor belt systems installed at remote user sites 24, 26 around the world. Thus, for each of the conveyor belts being monitored, current and historical data can be automatically tracked to determine trends associated with, for example, cable and/or cord defects, splice elongation, belt cross-sectional profiles, belt temperature profiles, belt wear or thickness profiles, belt operating time, belt tonnage carried and other desired conveyor belt conditions. The conveyor belt monitoring system 20 provides a web-based diagnostic and predictive system that permits an automatic comprehensive collection and consolidation of data relating to conveyor belt health. Using the trends and profiles, preventative maintenance or belt behavior predictions may then be made. Further, with an availability of more data from the monitoring system 20, a vendor of the conveyor belt systems 22, 40 is able to perform a more comprehensive analysis of conveyor belt performance. A more comprehensive analysis of more current and historical data may also lead to improved designs of the conveyor belt 34 and conveyor belt system 22 that may, in turn, may help to extend or maximize an operational life of the conveyor belt 34.

Thus, the remote conveyor belt monitoring system 20 may be used to enable and support a conveyor belt system service provider that takes responsibility for maintaining the conveyor belt systems 22, 24. With a capability of being able to remotely access data relating to current and historical conveyor belt conditions and operations, such a service provider may be able to more efficiently predict service needs and allocate service resources. Further, with current and historical belt condition and operating data available from a large number of conveyor belt installations, such a service provider may be more effectively able to predict conveyor belt performance, reliability and useful life. The remote conveyor belt monitoring system 20 may be used to enable and support a conveyor belt system leasing business, which also must be able to efficiently and effectively take responsibility for maintaining the conveyor belt systems 22, 24.

The web browser interface available at the PCs 32, 56 will change depending on the party authorized to access the data. For example, if the PC 32 is located in an accounting department of the user, the web browser interlace in the PC 32 will be different from an interface of a PC 56 that is located with a supplier of the conveyor belt systems. The user ultimately determines what data in the database 69 is available to each of the PCs 32, 56 by changing the web browser interfaces in the respective PCs.

While the present invention has been illustrated by a description of various embodiments and while these embodiments have been described in considerable detail, it is not the intention of Applicants to restrict or in any way limit the scope of the appended claims to such detail. Additional advantages the modifications will readily appear to those skilled in the art. For example, in the described embodiments, the field data conditioners 42, 43, RTUs 54 and HMIs 66, 67 are described as communicating using a network TCP/IP protocol compatible with an Ethernet. In alternative embodiments, TCP/IP protocols may be used that are compatible with other networks. Further, in the described embodiments, the internet 28 is used to wirelessly interconnect the monitoring center computer system 60, the PCs 32, 56 and the user sites 24, 26; however, in alternative embodiments, other appropriate wired or wireless communications systems may be used.

In the described embodiments, critical signals from the sensors 38 are operative to turn off the conveyor belt 34 by the field data conditioners providing a signal on the shutdown line 98. In other embodiments, a shutdown signal may be wired directly from a particular sensor or system to the conveyor belt control 44 to effect an immediate shutdown of the conveyor belt 34. Further, in the described embodiments, the encoder 110 is attached to the nondriven tail pulley 84, however, in other embodiments, the encoder 110 may be attached to any of the other nondriven pulleys, for example, pulleys 86, 88 and 90.

Therefore, the invention in its broadest aspects is not limited to the specific remote conveyor belt monitoring system details shown and described. Consequently, departures may be made from the details described herein without departing from the spirit and scope of the claims which follow.

What is claimed is:

1. A method of remotely monitoring multiple conditions of a plurality of conveyor belts using a web-based diagnostic and predictive system that permits an automatic comprehensive collection and consolidation of data relating to conveyor belt health comprising:

sensing conditions relating to a first operating conveyor belt at a first geographic location;

generating at the first location first data in response to the conditions sensed;

storing the first data in a first database at the first geographic location;

acquiring the first data with a monitoring computer at a monitoring location geographically remote from the first geographic location;

storing the first data in a monitoring database at the monitoring location;

sensing conditions relating to a second operating conveyor belt at a second geographic location;

generating at the second location second data in response to the conditions sensed;

storing the second data in a second database at the second geographic location;

acquiring the second data with said monitoring computer at said monitoring location geographically remote from the first and second geographic locations;

storing the second data in the monitoring database at the monitoring location.

2. The method of claim 1 wherein the method further comprises:

producing the first data with field data conditioners in response to the sensing, the first data representing conveyor belt conditions and operating characteristics;

acquiring the first data with a human-machine interface ("HMI") at the first geographic location and the second geographic location, the HMI operable to poll the field data conditioners and transfer the first data from the field data conditioners to the first database, and the second data from the field data conditioners to the second database over a local area network; and displaying with the HMI the first data and further data representing trends relating to conveyor belt conditions and operating characteristics.

3. The method of claim 1 wherein acquiring the second computer is at a facility of one of a vendor or a lessor or a maintenance service provider of the conveyor belt.

4. The method of claim 1 wherein said conditions comprise a combination of any number of the following: belt speed; belt position; belt load; belt tension; rolling resistance; belt temperature; belt splice failure; belt rip detection; belt width; and belt transverse motion.

5. The method of claim 1 wherein said conditions comprise all of the following: belt speed; belt position; belt load; belt tension; rolling resistance; belt temperature; belt splice failure; belt rip detection; belt width; and belt transverse motion.

* * * * *